United States Patent [19]
Bourdelais et al.

[11] Patent Number: 5,888,714
[45] Date of Patent: Mar. 30, 1999

[54] ADHESIVES SUCH AS METALLOCENE CATALYZED ETHYLENE PLASTOMERS FOR BONDING BIAXIALLY ORIENTED POLYOLEFIN SHEETS TO PAPER

[75] Inventors: Robert P. Bourdelais, Pittsford; Douglas N. Haydock, Webster; Thaddeus S. Gula, Rochester; Peter T. Aylward, Hilton, all of N.Y.

[73] Assignee: Eastman Kodak Company, Rochester, N.Y.

[21] Appl. No.: 998,161

[22] Filed: Dec. 24, 1997

[51] Int. Cl.$^6$ .............................. G03C 1/79; B32B 23/08; B32B 27/10
[52] U.S. Cl. .......................... 430/536; 430/538; 428/511; 428/513
[58] Field of Search .................................... 430/536, 538; 428/511, 513

[56] References Cited

U.S. PATENT DOCUMENTS

| | | | |
|---|---|---|---|
| 4,187,113 | 2/1980 | Mathews et al. | 430/538 |
| 4,283,486 | 8/1981 | Aono et al. | 430/538 |
| 4,339,507 | 7/1982 | Kurtz et al. | 428/522 |
| 4,377,616 | 3/1983 | Ashcraft et al. | 428/213 |
| 4,632,869 | 12/1986 | Park et al. | 428/315.5 |
| 4,758,462 | 7/1988 | Park et al. | 428/213 |
| 4,912,333 | 3/1990 | Roberts et al. | . |
| 4,937,299 | 6/1990 | Ewen et al. | 526/119 |
| 4,994,312 | 2/1991 | Maier et al. | . |
| 5,244,861 | 9/1993 | Campbell et al. | 430/201 |
| 5,429,916 | 7/1995 | Ohshima | 430/538 |
| 5,466,519 | 11/1995 | Shirakura et al. | 430/538 |
| 5,476,708 | 12/1995 | Reed et al. | 430/538 |
| 5,514,460 | 5/1996 | Surman et al. | . |

FOREIGN PATENT DOCUMENTS 0 803 377 A1  10/1997  European Pat. Off. .

*Primary Examiner*—Richard L. Schilling
*Attorney, Agent, or Firm*—Paul A. Leipold

[57] ABSTRACT

The invention relates to a photographic element comprising a paper base, at least one photosensitive silver halide layer, a layer of biaxially oriented polyolefin sheet between said paper base and said silver halide layer, wherein there is located between said biaxially oriented polyolefin sheet and said base paper a layer of adhesive resin comprising an ethylene polymer blended with at least one member selected from the group consisting of metallocene catalyzed polyolefin plastomer, ionomer, ethylene vinyl acetate copolymer, ethylene methyl methacrylate copolymer, ethylene ethyl acrylate copolymer, ethylene methyl acrylate copolymer, ethylene acrylic acid copolymer, ethylene ethyl acrylate maleic anhydride copolymer, or ethylene methacrylic acid copolymer.

22 Claims, No Drawings

ADHESIVES SUCH AS METALLOCENE CATALYZED ETHYLENE PLASTOMERS FOR BONDING BIAXIALLY ORIENTED POLYOLEFIN SHEETS TO PAPER

FIELD OF THE INVENTION

This invention relates to imaging materials. In a preferred form it relates to photographic papers.

BACKGROUND OF THE INVENTION

It has been proposed in U.S. Pat. No. 5,244,861 to utilize biaxially oriented polypropylene laminated to cellulose grade paper for use as a reflective receiver for thermal dye transfer imaging process. The preferred bonding agent in U.S. Pat. No. 5,244,861, to bond the biaxially oriented polypropylene sheets to paper, is low density polyethylene melt extruded from a slit die. Because of the high processing temperatures required for LDPE, shrinkage of the biaxially oriented sheet is common in the melt extrusion process. Shrinkage can cause undesirable changes in the Poisson ratio of the laminated receiver as well as a reduction in the optical performance of the receiver. It would be desirable to reduce the extrusion temperature of the bonding layer and an maintain acceptable integrity of the laminated support.

In the formation of color photographic paper a waterproof resin is melt extrusion coated on photographic grade cellulose paper. Polyethylene is commonly used and may be any one of a high density polyethylene, a low density polyethylene, a linear low density polyethylene or a mixture of two or more of the above mentioned polyethylenes.

In U.S. Pat. No. 4,339,507 (Kurtz et al.), linear low density ethylene hydrocarbon copolymers for extrusion coating are proposed to improve adhesion. While linear low density polyethylene does improve adhesion when compared to LDPE, LLDPE suffers from a phenomena referred to as draw resonance. Draw resonance is defined as the instability of the melt flow and is manifested as thickness variation both in the cross and machine directions. Draw resonance is a function of machine speed, becoming worse at higher line speeds. As a result, the maximum line speed at which an acceptable photographic paper can be manufactured is restricted by the onset of draw resonance.

During the manufacturing process for photographic papers, while the laminated photographic support is being emulsion coated and slit, the laminated structure is subjected to various forces in manufacturing that will cause delamination of the polypropylene sheet from the paper. The delamination may be a result of bonding layer failure to either the base paper or the polypropylene sheet. Also, when the photographic paper is being processed and finished at photofinishers, the laminated structure is also subjected to various forces in both the wet and dry state. Furthermore, when the photographic paper is kept for years by the final customer, the laminated structure is subjected to forces created by temperature and humidity changes that could cause delamination of the biaxially oriented polyolefin sheets from the cellulose paper base. Delamination of the biaxially oriented sheet from the paper during manufacturing will result in the product being wasted thus increasing the cost of manufacture. Delamination of the biaxially oriented sheet from the paper at either the photo finishing operation or in the final customer format will result in a loss in the appearance of the image and the reduction of the commercial value of the photograph. It would be desirable if a melt extruded bonding adhesive could prevent delamination of biaxially oriented sheets from the base paper during manufacture of a laminated imaging support and in the final customer format.

PROBLEM TO BE SOLVED BY THE INVENTION

There remains a need for a robust bonding layer between the oriented sheets and the base paper to ensure that the oriented sheets do not delaminate from the paper base in manufacturing, photo processing and in the final customer image format.

SUMMARY OF THE INVENTION

An object of the invention is to provide an improved photographic paper.

Another object of this invention is to provide a photographic paper that can be efficiently transported through photofinishing equipment without delamination.

A further object is to provide a photographic paper that will not delaminate when images are in the final customer format.

Another object of this invention is to provide a bonding layer that will allow a reduction in the extrusion temperature of the bonding layer and increase lamination productivity.

These and other objects of the invention generally are accomplished by a photographic element comprising a paper base, at least one photosensitive silver halide layer, a layer of biaxially oriented polyolefin sheet between said paper base and said silver halide layer, wherein there is located between said biaxially oriented polyolefin sheet and said base paper a layer of adhesive resin comprising a blend of an ethylene polymer with at least one member selected from the group consisting of metallocene catalyzed polyolefin plastomer, ionomer, ethylene vinyl acetate copolymer, ethylene methyl methacrylate copolymer, ethylene ethyl acrylate copolymer, ethylene methyl acrylate copolymer, ethylene acrylic acid copolymer, ethylene ethyl acrylate maleic anhydride copolymer, or ethylene methacrylic acid copolymer.

ADVANTAGEOUS EFFECT OF THE INVENTION

The invention provides an improved base for casting of photosensitive layers. It particularly provides an improved base for photographic materials that have greater resistance to delamination during the entire life cycle of photographic paper.

DETAILED DESCRIPTION OF THE INVENTION

There are numerous advantages of the invention over prior practices in the art. The invention provides a photographic element that has much less tendency to delaminate when subjected to delamination forces such as temperature changes, humidity changes and bending over small diameter rolls while the photographic element is being transported in photo processing equipment These and other delamination forces are commonly present during the manufacture of photographic paper, during both wet and dry photoprocessing and in the final customer format.

A further advantage of this invention is the ability to discontinue the common practice of the using CDT, defined as corona discharge treatment, to improve the strength of the bond between the paper and bonding agent The elimination of the CDT treatment from the photographic support manufacturing process would result in less equipment maintenance, reduction of imperfections associated with CDT treatment and the elimination of ozone emissions to the environment. Further, the invention will allow a lowering of extrusion temperatures over prior art practices. The lower extrusion temperature will result in lower levels of resin gels and resin spots, both of which are considered defects in photographic product applications. The lowering of extrusion temperatures will also result in lower air emissions to the environment and a reduction in amount of shrinkage of the biaxially oriented sheet during melt extrusion lamination.

Another advantage of this invention is the photographic materials of this invention are lower in cost to produce as the bonding layer thickness can be reduced and achieve satisfactory bond between the paper and the biaxially oriented sheet Cost may also be reduced by increasing the melt extrusion lamination productivity by increasing the speed of the laminator. A speed increase is possible because of the increase in bond strength. These and other advantages will be apparent from the detailed description below.

The terms as used herein, "top", "upper", "emulsion side", and "face" mean the side or toward the side of a photographic member bearing the imaging layers. The terms "bottom", "lower side", and "back" mean the side or toward the side of the photographic member opposite from the side bearing the photosensitive imaging layers or developed image. The terms "bonding layer", "adhesive layer" and "adhesive" mean the melt extruded resin layer between the biaxially oriented polyolefin sheets and the base paper.

Any suitable biaxially oriented polyolefin sheet may be used for the sheet on the top side of the laminated base of the invention. Microvoided composite biaxially oriented sheets are preferred and are conveniently manufactured by coextrusion of the core and surface layers, followed by biaxial orientation, whereby voids are formed around void-initiating material contained in the core layer. Such composite sheets are disclosed in, for example, U.S. Pat. Nos. 4,377,616; 4,758,462; and 4,632,869.

The core of the preferred composite sheet should be from 15 to 95% of the total thickness of the sheet, preferably from 30 to 85% of the total thickness. The nonvoided skin(s) should thus be from 5 to 85% of the sheet, preferably from 15 to 70% of the thickness.

The density (specific gravity) of the composite sheet, expressed in terms of "percent of solid density" is calculated as follows:

$$\frac{\text{Composite Sheet Density}}{\text{Polymer Density}} \times 100 = \% \text{ of Solid Density}$$

Percent solid density should be between 45% and 100%, preferably between 67% and 100%. As the percent solid density becomes less than 67%, the composite sheet becomes less manufacturable due to a drop in tensile strength and it becomes more susceptible to physical damage.

The total thickness of the composite sheet can range from 12 to 100 micrometers, preferably from 20 to 70 micrometers. Below 20 micrometers, the microvoided sheets may not be thick enough to minimize any inherent non-planarity in the support and would be more difficult to manufacture. At thickness higher than 70 micrometers, little improvement in either surface smoothness or mechanical properties are seen, and so there is little justification for the further increase in cost for extra materials.

The biaxially oriented sheets of the invention preferably have a water vapor permeability that is less than $0.85 \times 10^{-4}$ g/mm$^2$/day/atm. This allows faster emulsion hardening, as the laminated support of this invention greatly slows the rate of water vapor transmission from the emulsion layers during coating of the emulsions on the support. The transmission rate is measured by ASTM F1249.

"Void" is used herein to mean devoid of added solid and liquid matter, although it is likely the "voids" contain gas. The void-initiating particles which remain in the finished packaging sheet core should be from 0.1 to 10 micrometers in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The void-initiating material may be selected from a variety of materials, and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=CH$_2$, wherein Ar represents an aromatic hydrocarbon radical, or an aromatic halohydrocarbon radical of the benzene series and R is hydrogen or the methyl radical; acrylate-type monomers include monomers of the formula CH$_2$=C(R')—C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula CH$_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series HO(CH$_2$)$_n$OH wherein n is a whole number within the range of 2–10 and having reactive olefmic linkages within the polymer molecule, the above described polyesters which include copolymerized therein up to 20 percent by weight of a second acid or ester thereof having reactive olefmic unsaturation and mixtures thereof, and a cross-linking agent selected from the group consisting of divinylbenzene, diethylene glycol dimethacrylate, diallyl fumarate, diallyl phthalate and mixtures thereof.

Examples of typical monomers for making the crosslinked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethyl-propane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles; characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads or inorganic particles such as clay, talc, barium sulfate, calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin sheet is utilized.

For the biaxially oriented sheet on the top side toward the emulsion, suitable classes of thermoplastic polymers for the biaxially oriented sheet and the core matrix-polymer of the preferred composite sheet comprise polyolefins.

Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polypropylene is preferred, as it is low in cost and has desirable strength properties.

The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

Addenda may be added to the core matrix and/or to the skins to improve the whiteness of these sheets. This would include any process which is known in the art including adding a white pigment, such as titanium dioxide, barium sulfate, clay, or calcium carbonate. This would also include adding fluorescing agents which absorb energy in the UV region and emit light largely in the blue region, or other additives which would improve the physical properties of the sheet or the manufacturability of the sheet. For photographic use, a white base with a slight bluish tint is preferred.

The coextrusion, quenching, orienting, and heat setting of these composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

The composite sheet, while described as having preferably at least three layers of a microvoided core and a skin layer on each side, may also be provided with additional layers that may serve to change the properties of the biaxially oriented sheet. A different effect may be achieved by additional layers. Such layers might contain tints, antistatic materials, or different void-making materials to produce sheets of unique properties. Biaxially oriented sheets could be formed with surface layers that would provide an improved adhesion, or look to the support and photographic element. The biaxially oriented extrusion could be carried out with as many as 10 layers if desired to achieve some particular desired property.

These composite sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability, coating polyvinylidene chloride for heat seal properties. Further examples include flame, plasma or corona discharge treatment to improve printability or adhesion.

By having at least one nonvoided skin on the microvoided core, the tensile strength of the sheet is increased and makes it more manufacturable. It allows the sheets to be made at wider widths and higher draw ratios than when sheets are made with all layers voided. Coextruding the layers further simplifies the manufacturing process.

The structure of a typical biaxially oriented, microvoided sheet to be bonded to a suitable photographic base paper is as follows:

---
solid skin layer
microvoided core layer
solid skin layer

---

The sheet on the side of the base paper opposite to the emulsion layers may be any suitable sheet. The sheet may or may not be microvoided. It may have the same composition as the sheet on the top side of the paper backing material. Biaxially oriented sheets are conveniently manufactured by coextrusion of the sheet, which may contain several layers, followed by biaxial orientation. Such biaxially oriented sheets are disclosed in, for example, U.S. Pat. No. 4,764,425, the disclosure of which is incorporated by reference.

The preferred biaxially oriented sheet is a biaxially oriented polyolefin sheet, most preferably a sheet of polyethylene or polypropylene. The thickness of the biaxially oriented sheet should be from 10 to 150 micrometers. Below 15 micrometers, the sheets may not be thick enough to minimize any inherent non-planarity in the support and would be more difficult to manufacture. At thickness higher than 70 micrometers, little improvement in either surface smoothness or mechanical properties are seen, and so there is little justification for the further increase in cost for extra materials.

Suitable classes of thermoplastic polymers for the biaxially oriented sheet include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Suitable polyolefins include polypropylene, polyethylene, polymethylpentene, and mixtures thereof. Polyolefin copolymers, including copolymers of propylene and ethylene such as hexene, butene and octene are also useful. Polypropylenes are preferred because they are low in cost and have good strength and surface properties.

Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedi-carboxylic, sodiosulfoisophthalic, and mixtures thereof. Examples of suitable glycols include ethylene glycol, propylene glycol, butanediol, pentanediol, hexanediol, 1,4-cyclohexanedimethanol, diethylene glycol, other polyethylene glycols, and mixtures thereof. Such polyesters are well known in the art and may be produced by well-known techniques, e.g., those described in U.S. Pat. Nos. 2,465,319 and U.S. Pat. No. 2,901,466. Preferred continuous matrix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607; 4,459,402; and 4,468,510.

Useful polyamides include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

The biaxially oriented sheet on the back side of the laminated base can be made with layers of the same polymeric material, or it can be made with layers of different polymeric composition. For compatibility, an auxiliary layer can be used to promote adhesion of multiple layers.

Addenda may be added to the biaxially oriented back side sheet to improve the whiteness of these sheets. This would include any process which is known in the art including adding a white pigment, such as titanium dioxide, barium sulfate, clay, or calcium carbonate. This would also include adding fluorescing agents which absorb energy in the UV region and emit light largely in the blue region, or other additives which would improve the physical properties of the sheet or the manufacturability of the sheet.

The coextrusion, quenching, orienting, and heat setting of these biaxially oriented sheets may be effected by any process which is known in the art for producing oriented sheet, such as by a flat sheet process or a bubble or tubular process. The flat sheet process involves extruding or coextruding the blend through a slit die and rapidly quenching the extruded or coextruded web upon a chilled casting drum so that the polymer component(s) of the sheet are quenched below their solidification temperature. The quenched sheet is then biaxially oriented by stretching in mutually perpendicular directions at a temperature above the glass transition temperature of the polymer(s). The sheet may be stretched in one direction and then in a second direction or may be simultaneously stretched in both directions. After the sheet has been stretched, it is heat set by heating to a temperature sufficient to crystallize the polymers while restraining to some degree the sheet against retraction in both directions of stretching.

The biaxially oriented sheet on the back side of the laminated base, while described as having preferably at least one layer, may also be provided with additional layers that may serve to change the properties of the biaxially oriented sheet. A different effect may be achieved by additional layers. Such layers might contain tints, antistatic materials, or slip agents to produce sheets of unique properties. Biaxially oriented sheets could be formed with surface layers that would provide an improved adhesion, or look to the support and photographic element The biaxially oriented extrusion could be carried out with as many as 10 layers if desired to achieve some particular desired property.

These biaxially oriented sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability and a coating polyvinylidene chloride for heat seal properties. Further examples include flame, plasma or corona discharge treatment to improve printability or adhesion.

The structure of a typical biaxially oriented sheet of the invention that may be bonded with the core layer adjacent to a photographic quality base paper is as follows:

| treated skin layer |
| solid core layer |

The support to which the microvoided composite sheets and biaxially oriented sheets are laminated for the laminated support of the photosensitive silver halide layer may be a polymeric, a synthetic paper, cloth, woven polymer fibers, or a cellulose fiber paper support, or laminates thereof. The base also may be a microvoided polyethylene terephalate such as disclosed in U.S. Pat. Nos. 4,912,333; 4,994,312;

and 5,055,371, the disclosure of which is incorporated by reference. For a color photographic imaging element, photographic quality cellulose fiber paper is preferred.

The adhesive of the invention is used for bonding biaxially oriented sheets to cellulose photographic paper is selected such that it can be melt extruded at about 160° C. to 300° C.

Adhesive resins of the invention are preferred for bonding biaxially oriented sheets to photographic grade cellulose paper. An adhesive resin used in this invention can be melt extruded and provide sufficient bond strength between the cellulose paper and the biaxially oriented sheet For use in the conventional photographic system, peel forces between the paper and the biaxially oriented sheets need to be greater than 150 grams/5 cm to prevent delamination during the manufacture of the photographic base, during processing of an image or in the final image format. "Peel strength" or "separation force" or "peel force" is the measure of the amount of force required to separate the biaxially oriented sheets from the base paper. Peel strength is measured using an Instron gauge and the 180-degree peel test with a crosshead speed of 1.0 meters/min. The sample width is 5 cm and the distance peeled is 10 cm.

In the case of a silver halide photographic system, suitable adhesive resins must also not interact with the light sensitive emulsion layer. Preferred examples of adhesive resins are ionomer (e.g., an ethylene methacrylic acid copolymer cross-linked by metal ions such as Na ions or Zn ions), ethylene vinyl acetate copolymer, ethylene methyl methacrylate copolymer, ethylene ethyl acrylate copolymer, ethylene methyl acrylate copolymer, ethylene acrylic acid copolymer, ethylene ethyl acrylate maleic anhydride copolymer, or ethylene methacrylic acid copolymer. These adhesive resins are preferred because they can be easily melt extruded and provide peel forces between biaxially oriented polyolefin sheets and base paper greater than 150 grams/5 cm.

Metallocene catalyzed polyolefin plastomers are most preferred for bonding-oriented polyolefin sheets to photographic base paper because they offer a combination of excellent adhesion to smooth biaxially oriented polyolefin sheets, are easily melt extruded using conventional extrusion equipment and are low in cost when compared to other adhesive resins. Metallocenes are class of highly active olefin catalysts that are used in the preparation of polyolefin plastomers. These catalysts, particularly those based on group IVB transition metals such as zirconium, titanium, and hafnium, show extremely high activity in ethylene polymerization. Various forms of the catalyst system of the metallocene type may be used for polymerization to prepare the polymers used for bonding biaxially oriented polyolefin sheets to cellulose paper. Forms of the catalyst system include but are not limited to those of homogeneous, supported catalyst type, high pressure process or a slurry or a solution polymerization process. The metallocene catalysts are also highly flexible in that, by manipulation of catalyst composition and reaction conditions, they can be made to provide polyolefins with controllable molecular weights. Suitable polyolefins include polypropylene, polyethylene, polymethylpentene, polystyrene, polybutylene and mixtures thereof. Development of these metallocene catalysts for the polymerization of ethylene is found in U.S. Pat. No. 4,937,299 (Ewen et al.) The most preferred metallocene catalyzed copolymers are very low density polyethylene (VLDPE) copolymers of ethylene and a $C_4$ to $C_{10}$ alpha monolefin, most preferably copolymers and terpolymers of ethylene and butene-1 and hexene-1. The melt index of the metallocene catalyzed ethylene plastomers preferable fall in a range of 2.5 g/10 min to 27 g/10 min. The density of the metallocene catalyzed ethylene plastomers preferably falls in a range of 0.8800 to 0.9100. Metallocene catalyzed ethylene plastomers with a density greater than 0.9200 do not provide sufficient adhesion to biaxially oriented polyolefin sheets.

Melt extruding metallocene catalyzed ethylene plastomers presents some processing problems. Processing results from earlier testing in food packaging applications indicated that their coating performance, as measured by the neck-in to draw-down performance balance, was worse than conventional low density polyethylene making the use of metallocene catalyzed plastomers difficult in a single layer melt extrusion process that is typical for the production of current photographic support. By blending low density polyethylene with the metallocene catalyzed ethylene plastomer, acceptable melt extrusion coating performance was obtained making the use of metallocene catalyzed plastomers blended with low density polyethylene (LDPE) very efficient. The preferred level of low density polyethylene to be added is dependent on the properties of the LDPE used (properties such as melt index, density and type of long chain branching) and the properties of the metallocene catalyzed ethylene plastomer selected. Since metallocene catalyzed ethylene plastomers are more expensive than LDPE, a cost to benefit trade-off is necessary to balance material cost with processing advantages such as neck-in and product advantages such as biaxially oriented film adhesion to paper. In general the preferred range of LDPE blended is 10% to 80% by weight.

The bonding layer may also contain pigments which are known to improve the photographic responses such as whiteness or sharpness. Titanium dioxide is used in this invention to improve image sharpness. The $TiO_2$ used may be either anatase or rutile type. In the case of whiteness, anatase is the preferred type. In the case of sharpness, rutile is the preferred. Further, both anatase and rutile $TiO_2$ may be blended to improve both whiteness and sharpness. Examples of $TiO_2$ that are acceptable for a photographic system are Dupont Chemical Co. R101 rutile $TiO_2$ and DuPont Chemical Co. R104 rutile $TiO_2$. Other pigments to improve photographic responses may also be used in this invention. Preferred pigments are talc, kaolin, $CaCO_3$, $BaSO_4$, ZnO, $TiO_2$, ZnS, and $MgCO_3$.

The bonding layer may also contain addenda known in the art to absorb light A light absorbing layer in this invention is used to improve optical properties of an image, properties such as opacity and image resolution. An example of a light absorbing material and can be added to the bonding layer is an extrusion grade of carbon black. Carbon black addenda is produced by the controlled combustion of liquid hydrocarbons and can be added to the bonding layer prior to melt extrusion.

In the manufacturing process for this invention, preferred bonding agents are melt extruded from a slit die. In general, a T die or a coat hanger die are preferably used. The melt temperature of the preferred bonding agent is 240° C. to 325° C. Extrusion lamination is carried out by bringing together the upper and lower side biaxially oriented sheets and the base paper with application of the bonding agent between the base paper and the biaxially oriented sheet followed by their being pressed together in a nip such as between two rollers. The total thickness of the bonding layer at the top and bottom of the base paper can range from 2.5 μm to 25 μm preferably from 3.8 μm to 13 μm. Below 3.8 μm it is difficult to maintain a consistent melt extruded bonding layer thickness. At thickness higher than 13 μm there is little improvement in biaxially oriented sheet adhesion to paper.

As used herein the phrase "imaging element" is a material that may be used as a laminated support for the transfer of images to the support by techniques such as ink jet printing or thermal dye transfer, as well as a support for silver halide images. As used herein, the phrase "photographic element" is a material that utilizes photosensitive silver halide in the formation of images. In the case of thermal dye transfer or ink jet, the image layer that is coated on the imaging element may be any material that is known in the art accept thermal images or ink jet images, such as gelatin, pigmented latex, polyvinyl alcohol, polycarbonate, polyvinyl pyrrolidone, starch, and methacrylate. The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of time. The precipitation and spectral and chemical sensitization methods utilized in preparing the emulsions employed in the invention can be those methods known in the art.

Chemical sensitization of the emulsion typically employs sensitizers such as: sulfur-containing compounds, e.g., allyl isothiocyanate, sodium thiosulfate and allyl thiourea; reducing agents, e.g., polyamines and stannous salts; noble metal compounds, e.g., gold, platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating, and extrusion coating.

The silver halide emulsions utilized in this invention may be comprised of any halide distribution. Thus, they may be comprised of silver chloride, silver chloroiodide, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride; and optimally greater than about 95 mole percent silver chloride.

The silver halide emulsions can contain grains of any size and morphology. Thus, the grains may take the form of cubes, octahedrons, cubo- octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in *The Theory of the Photographic Process*, Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectralchemical sensitization to reduction sensitize an emulsion include ascorbic acid derivatives; tin compounds; polyamine compounds; and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23, 113 (1979). Examples of processes for preparing intentionally reduction sensitized silver halide emulsions are described in EP 0 348 934 A1 (Yamashita), EP 0 369 491 (Yamashita), EP 0 371 388 (Ohashi), EP 0 396 424 A1 (Takada), EP 0 404 142 A1 (Yamada), and EP 0 435 355 A1 (Makino).

The photographic elements of this invention may use emulsions doped with Group VIII metals such as iridium, rhodium, osmium, and iron as described in *Research Disclosure*, September 1996, Item 38957, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black and white photographic print elements.

The photographic elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about30 µm.

In the following table, reference will be made to (1) Research Disclosure, December 1978, Item 17643, (2) Research Disclosure, December 1989, Item 308119, and (3) Research Disclosure, September 1996, Item 38957, all published by Kenneth Mason Publications, Ltd., Dudley Annex, 12a North Street, Emsworth, Hampshire PO10 7DQ, ENGLAND. The table and the references cited in the table are to be read as describing particular components suitable for use in the elements of the invention. The table and its cited references also describe suitable ways of preparing, exposing, processing and manipulating the elements, and the images contained therein.

| Reference | Section | Subject Matter |
|---|---|---|
| 1 | I, II | Grain composition, |
| 2 | I, II, IX, X, XI, XII, XIV, XV | morphology and preparation. Emulsion preparation including |
| | I, II, III, IX | hardeners, coating aids, |
| 3 | A & B | addenda, etc. |
| 1 | III, IV | Chemical sensitization and |
| 2 | III, IV | spectral sensitization/ |
| 3 | IV, V | desensitization |
| 1 | V | UV dyes, optical |
| 2 | V | brighteners, luminescent |
| 3 | VI | dyes |
| 1 | VI | Antifoggants and stabilizers |
| 2 | VI | |
| 3 | VII | |
| 1 | VIII | Absorbing and scattering |
| 2 | VIII, XIII, XVI | materials; Antistatic layers; matting agents |
| 3 | VIII, IX C & D | |
| 1 | VII | Image-couplers and image- |
| 2 | VII | modifying couplers; Dye |
| 3 | X | stabilizers and hue modifiers |
| 1 | XVII | Supports |
| 2 | XVII | |
| 3 | XV | |
| 3 | XI | Specific layer arrangements |
| 3 | XII, XIII | Negative working emulsions; Direct positive emulsions |
| 2 | XVIII | Exposure |
| 3 | XVI | |
| 1 | XIX, XX | Chemical processing; |
| 2 | XIX, XX, XXII | Developing agents |
| 3 | XVIII, XIX, XX | |
| 3 | XIV | Scanning and digital processing procedures |

The photographic elements can be exposed with various forms of energy which encompass the ultraviolet, visible, and infrared regions of the electromagnetic spectrum, as well as with electron beam, beta radiation, gamma radiation, x-ray, alpha particle, neutron radiation, and other forms of corpuscular and wave-like radiant energy in either noncoherent (random phase) forms or coherent (in phase) forms, as produced by lasers. When the photographic elements are intended to be exposed by x-rays, they can include features found in conventional radiographic elements.

The photographic elements are preferably exposed to actinic radiation, typically in the visible region of the spectrum, to form a latent image, and then processed to form a visible image, preferably by other than heat treatment. Processing is preferably carried out in the known RA-4™ (Eastman Kodak Company) Process or other processing systems suitable for developing high chloride emulsions.

The laminated substrate of the invention may have copy restriction features incorporated such as disclosed in U.S. patent application Ser. No. 08/598,785 filed Feb. 8, 1996 and application Ser. No. 08/598,778 filed on the same day. These applications disclose rendering a document copy restrictive by embedding into the document a pattern of invisible microdots. These microdots are, however, detectable by the electro-optical scanning device of a digital document copier. The pattern of microdots may be incorporated throughout the document. Such documents may also have colored edges or an invisible microdot pattern on the back side to enable users or machines to read and identify the media. The media may take the form of sheets that are capable of bearing an image. Typical of such materials are photographic paper and film materials composed of polyethylene resin coated paper, polyester, (poly)ethylene naphthalate, and cellulose triacetate based materials.

The microdots can take any regular or irregular shape with a size smaller than the maximum size at which individual microdots are perceived sufficiently to decrease the usefulness of the image, and the minimum level is defined by the detection level of the scanning device. The microdots may be distributed in a regular or irregular array with center-to-center spacing controlled to avoid increases in document density. The microdots can be of any hue, brightness, and saturation that does not lead to sufficient detection by casual observation, but preferably of a hue least resolvable by the human eye, yet suitable to conform to the sensitivities of the document scanning device for optimal detection.

In one embodiment the information-bearing document is comprised of a support, an image-forming layer coated on the support and pattern of microdots positioned between the support and the image-forming layer to provide a copy restrictive medium. Incorporation of the microdot pattern into the document medium can be achieved by various printing technologies either before or after production of the original document. The microdots can be composed of any colored substance, although depending on the nature of the document, the colorants may be translucent, transparent, or opaque. It is preferred to locate the microdot pattern on the support layer prior to application of the protective layer, unless the protective layer contains light scattering pigments. Then the microdots should be located above such layers and preferably coated with a protective layer. The microdots can be composed of colorants chosen from image dyes and filter dyes known in the photographic art and dispersed in a binder or carrier used for printing inks or light-sensitive media.

In a preferred embodiment the creation of the microdot pattern as a latent image is possible through appropriate temporal, spatial, and spectral exposure of the photosensitive materials to visible or non-visible wavelengths of electromagnetic radiation. The latent image microdot pattern can be rendered detectable by employing standard photographic chemical processing. The microdots are particularly useful for both color and black-and-white image-forming photographic media. Such photographic media will contain at least one silver halide radiation sensitive layer, although typically such photographic media contain at least three silver halide radiation sensitive layers. It is also possible that such media contain more than one layer sensitive to the same region of radiation. The arrangement of the layers may take any of the forms known to one skilled in the art, as discussed in Research Disclosure 37038 of February 1995.

While this invention has been discussed with respect to photographic elements, it also could be used as a substrate for imaging material such as ink jet, thermal dye transfer and electrophotographic reflective output.

The following examples illustrate the practice of this invention. They are not intended to be exhaustive of all possible variations of the invention. Parts and percentages are by weight unless otherwise indicated.

COMMERCIAL GRADE PAPER OF EXAMPLES

A photographic paper support was produced by refining a pulp furnish of 50% bleached hardwood kraft, 25% bleached hardwood sulfite, and 25% bleached softwood sulfite through a double disk refiner, then a Jordan conical refiner to a Canadian Standard Freeness of 200 cc. To the resulting pulp furnish was added 0.2% alkyl ketene dimer, 1.0% cationic cornstarch, 0.5% polyamide-epichlorohydrin, 0.26 anionic polyacrylamide, and 5.0% $TiO_2$ on a dry weight basis. An about 46.5 lbs. per 1000 sq. ft. (ksf) bone dry weight base paper was made on a fourdrinier paper machine, wet pressed to a solid of 42%, and dried to a moisture of 10% using steam-heated dryers achieving a Sheffield Porosity of 160 Sheffield Units and an apparent density 0.70 g/cc. The paper base was then surface sized using a vertical size press with a 10% hydroxyethylated cornstarch solution to achieve a loading of 3.3 wt. % starch. The surface sized support was calendered to an apparent density of 1.04 gm/cc.

Example 1

The following laminated photographic bases (Table I) were prepared by extrusion laminating the following sheets to both sides of a photographic grade cellulose paper base:
Top sheet: (Emulsion side)
OPPalyte 350 ASW (Mobil Chemical Co.)
A composite sheet (31 mm thick) (d=0.68 g/cc) consisting of a microvoided and oriented polypropylene core (approximately 60% of the total sheet thickness), with a homopolymer non-microvoided oriented polypropylene layer on each side; the void initiating material used is poly(butylene terephthalate).
Bottom sheet: (Back side)
BICOR 70 MLT (Mobil Chemical Co.)
A one-side matte finish, one-side treated polypropylene sheet (18 mm thick) (d=0.9 g/cc) consisting of a solid oriented polypropylene core. The matte finish side is towards the back of the element after bonding.

The photographic bases in Table I were prepared by extrusion laminating using the following bonding layer materials. The following resin adhesive bonding layer materials were used to laminate the above films to both sides of a photographic grade cellulose paper base:
Low density polyethylene:
1924P Low Density Polyethylene (Eastman Chemical Co.)
A extrusion grade low density polyethylene with a density of 0.923 g/cm3 and a melt index of 4.2.

Metallocene catalyzed ethylene plastomer:
SLP-9088 Ethylene-Olefin Copolymer (Exxon Chemical Co.)
A metallocene catalyzed ethylene based hexene copolymer with a density of 0.900 grams/cm3 and a melt index of 16.5. The support structure of this example is as follows:

OPPalyte 350 ASW
Resin adhesive layer
Base paper
Resin adhesive layer
BICOR 70 MLT The photographic bases in Table I were prepared by extrusion lamination using a slit die and the resin blend ratio listed in Table I. The ratio figure in Table I is the % polyolefin copolymer to % low density polyethylene where the % polyolefin copolymer plus the % low density polyethylene must total 100%. The melt temperature in Table I is the exit temperature, in degrees Celsius, of the resin blend from the slit extrusion die. The bonding layer thickness in Table I is the thickness, measured in micrometers, of the bonding layer between the sheets and the cellulose paper base. The CDT in Table I indicates if the CDT (corona discharge unit) applied to the cellulose paper base (used to improve adhesion) was either on or off. The peel strength, measured in grams/5 cm, is the separation force between the cellulose paper base and the back side sheet. The separation force was measured using an Instron. The test used was the 180 degree peel test with a crosshead speed of 1.0 meter/min. The sample width was 5 cm and the distance peeled was 10 cm. The peel strength readings in Table I are an average of 9 individual readings.

TABLE I

| Feature | Extrusion Resin Blend Ratio | Melt Temp (C.) | Bonding Layer Thickness (microns) | CDT | Peel Strength (grams) |
|---|---|---|---|---|---|
| A | 20/80 | 315 | 12.8 | ON | 395 |
| B | 40/60 | 315 | 12.8 | ON | 490 |
| C | 40/60 | 315 | 12.8 | OFF | 435 |
| D | 60/40 | 315 | 12.8 | ON | 527 |
| E | 80/20 | 315 | 12.8 | ON | 539 |
| F | 40/60 | 260 | 12.8 | ON | 134 |
| G | 40/60 | 274 | 12.8 | ON | 270 |
| H | 40/60 | 288 | 12.8 | ON | 395 |
| I | 40/60 | 302 | 12.8 | ON | 455 |
| J | 40/60 | 315 | 6.4 | ON | 316 |
| K | 40/60 | 315 | 25.6 | ON | 592 |
| L | 0/100 | 315 | 12.8 | ON | 87 |

The data in Table I show that when polyolefin sheets are laminated to cellulose paper base using a blend of polyolefin copolymer and low density polyethylene (features A–E), the polyolefin copolymer blend with polyethylene provides superior peel strength when compared to prior art laminated bases (feature L). The data in Table I also show that blending polyolefin copolymer with low density polyethylene can also result in a significant bonding layer thickness reduction (50%) without a significant loss in peel strength (feature J vs. feature L). The data in Table I also show that acceptable peel strength can still be maintained when the CDT treatment to the paper, which is necessary in the prior art to increase bond strength, is turned off (feature B vs. feature C). The data in Table I also show that a 55° C. reduction in extrusion temperature is possible while maintaining acceptable peel strength. This will reduce the undesirable change of the Poisons ratio of the imaging support during melt extrusion lamination.

The invention has been described in detail with particular reference to certain preferred embodiments thereof, but it will be understood that variations and modifications can be effected within the spirit and scope of the invention.

What is claimed is:

1. A photographic element comprising a paper base, at least one photosensitive silver halide layer, a layer of biaxially oriented polyolefin sheet between said paper base and said silver halide layer, wherein there is located between said biaxially oriented polyolefin sheet and said base paper a layer of adhesive resin comprising a blend of an ethylene polymer with at least one member selected from the group consisting of metallocene catalyzed polyolefin plastomer, ionomer, ethylene vinyl acetate copolymer, ethylene methyl methacrylate copolymer, ethylene ethyl acrylate copolymer, ethylene methyl acrylate copolymer, ethylene acrylic acid copolymer, ethylene ethyl acrylate maleic anhydride copolymer, or ethylene methacrylic acid copolymer.

2. The element of claim 1 wherein said adhesive comprises a blend of metallocene catalyzed polyolefin plastomer and a polyolefin.

3. The element of claim 1 wherein said ethylene polymer comprises a low density polyethylene.

4. The element of claim 1 wherein said adhesive comprises a metallocene catalyzed ethylene plastomer with a density less than 0.9100.

5. The element of claim 1 wherein said adhesive comprises metallocene catalyzed ethylene plastomer blended with polyethylene wherein the blended adhesive comprises 10 to 80 percent metallocene catalyzed ethylene plastomer.

6. The photographic element of claim 1 wherein said adhesive layer contains titanium dioxide.

7. The photographic element of claim 1 wherein said adhesive layer contains at least one pigment selected from the group consisting of talc, kaolin, $CaCO_3$, $BaSO_4$, ZnO, $TiO_2$, ZnS, $MgCO_3$, and carbon.

8. The photographic element of claim 5 wherein said adhesive layer contains 20 to 50 percent metallocene catalyzed ethylene plastomer.

9. The photographic element of claim 1 wherein said adhesive layer has a thickness of from 2.5 μm to 13 μm.

10. A imaging element comprising a paper base, at least one imaging carrying layer, a layer of biaxially oriented polyolefin sheet between said paper base and said imaging carrying layer, wherein there is located between said biaxially oriented polyolefin sheet and said base paper a layer of adhesive resin comprising an ethylene polymer blended with at least one member selected from the group consisting of metallocene catalyzed polyolefin plastomer, ionomer, ethylene vinyl acetate copolymer, ethylene methyl methacrylate copolymer, ethylene ethyl acrylate copolymer, ethylene methyl acrylate copolymer, ethylene acrylic acid copolymer, ethylene ethyl acrylate maleic anhydride copolymer, or ethylene methacrylic acid copolymer.

11. The element of claim 10 wherein said adhesive comprises a blend of metallocene catalyzed polyolefin plastomer and a polyolefin.

12. The element of claim 10 wherein said adhesive comprises metallocene catalyzed ethylene plastomer.

13. The element of claim 10 wherein said adhesive comprises a metallocene catalyzed ethylene plastomer with a density less than 0.9100.

14. The element of claim 10 wherein said adhesive comprises metallocene catalyzed ethylene plastomer blended with polyethylene wherein the blended adhesive comprises 10 to 80 percent metallocene catalyzed ethylene plastomer.

15. The imaging element of claim 10 wherein said adhesive layer contains titanium dioxide.

16. The imaging element of claim 10 wherein said adhesive layer contains at least one pigment selected from the group consisting of talc, kaolin, $CaCO_3$, $BaSO_4$, ZnO, $TiO_2$, ZnS, $MgCO_3$, and carbon.

17. The imaging element of claim 14 wherein said adhesive layer contains 20 to 50 percent metallocene catalyzed ethylene plastomer.

18. The imaging element of claim 1 wherein said adhesive layer has a thickness of from 2.5 μm to 26 μm.

19. The imaging element of claim 1 wherein said adhesive layer has a thickness of from 2.5 μm to 13 μm.

20. The photographic element of claim 4 wherein said photographic element further comprises a biaxially oriented polyolefin sheet on the bottom of said base paper and said paper is a cellulose fiber paper.

21. The imaging element of claim 12 wherein said imaging element further comprises a biaxially oriented sheet on the bottom of said imaging element and said paper is a cellulose fiber paper.

22. The photographic element of claim 1 wherein said adhesive layer has a thickness of from 2.5 μm to 26 μm.

* * * * *